Patented Apr. 25, 1950

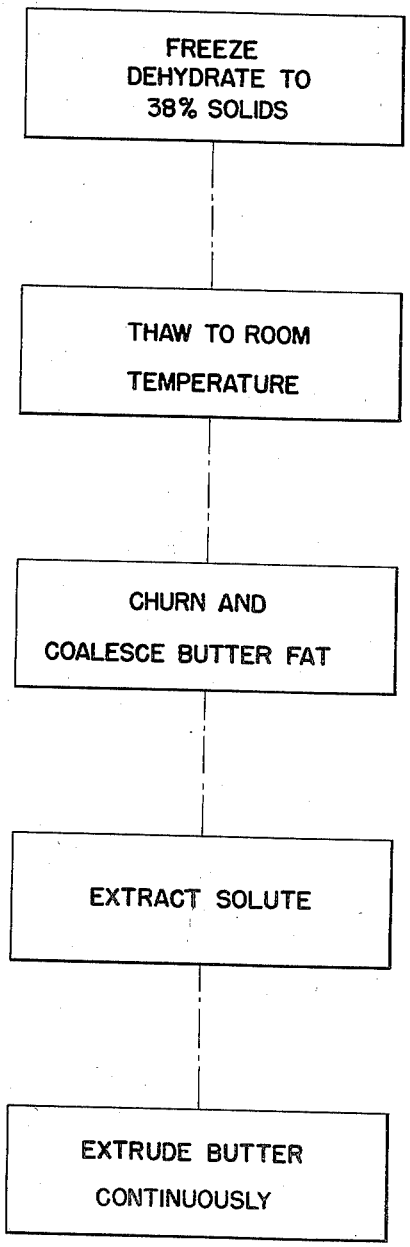

2,505,654

UNITED STATES PATENT OFFICE 2,505,654

METHOD OF MANUFACTURING BUTTER

Harry A. Toulmin, Jr., Dayton, Ohio, assignor to The Commonwealth Engineering Company of Ohio, Dayton, Ohio, a corporation of Ohio Application April 27, 1949, Serial No. 89,907

12 Claims. (Cl. 99—119)

This invention relates to the making of butter and, particularly, to a method of making butter by a continuous process as distinguished from the customary batch type process according to the prior art.

Butter is made from both animal and vegetable products which contain oils or fats. The animal product generally employed is milk, and, according to this invention, the milk can be converted directly into butter, or the fats therein can first be concentrated and the butter made therefrom. In connection with the making of butter from vegetable oils, a similar process is employed which may include a preliminary concentrating of the fats or oils therein, if found desirable.

Inasmuch as one of the most familiar butter products is table butter made from cream, it is in connection with this product that this invention is particularly described. It will be understood, however, that the invention pertains to the making of all butters, whether from vegetable or animal products.

It is well known that the formation of butter from cream is a process of changing a cream from a fat-dispersed-in-milk serum state to a state of milk serum-dispersed-in-fat. In general, this involves a mechanical conversion of the butterfat from the small discrete globules suspended in the serum to a coalesced condition wherein the fat globules are merged into a substantially continuous mass which, upon the working out of a predetermined amount of the included serum, becomes commercial butter.

From the foregoing it would appear that the only problem in connection with the making of butter from cream was the concentration of the fat until it coalesced into a continuous phase. This, however, is not true, because one of the most important characteristics of butter is its flavor and odor, and both of these qualities are imparted to the finished butter by substances at least partly entrained in the milk serum. Thus, the fat can be concentrated only to a certain degree while still retaining in it sufficient serum to insure good flavor and odor in the finished butter.

It has also been found that when the butterfat is concentrated beyond a certain degree before making the butter, the resultant product will be greasy and oily in feel and appearance, and this, naturally, materially detracts from its commercial value.

In the art of manufacturing butter, then, not only must the fat globules be coalesced into a continuous phase, but, throughout the process of effecting this conversion, the factors which impart taste, odor and texture to the final butter product must be carefully regulated. These several factors provide the considerations which have been largely determinative of the present practice of producing butter in batches, because, in this type of process, the adjustment of the quality controlling factors and ratios is more easily accomplished. The manufacture of butter by batch process is, however, relatively slow and expensive. At best, different batches will produce butter of different quality.

A preferable way of manufacturing butter, but one which has not heretofore been successfully accomplished, is that of producing butter by a continuous cycle and in a manner that takes into account the importance of the above referred to critical quality controlling factors.

The primary object of the present invention is the provision of a method of making butter according to such a continuous cycle.

Another object of this invention is the provision of a continuous buttermaking process that maintains the proper flavor and odor in the finished product.

Another object is to provide a continuous process for making butter which results in a product of highly uniform good quality.

According to my invention, the cream, which is preferably already concentrated to a certain degree by a centrifugal or gravitational separation thereof from the milk, is subjected to freezing, whereby the milk serum and fat separate to a certain extent, thus permitting the draining off of at least part of the milk serum from the fat. Thereafter, the now concentrated fat is thawed to room temperature or to a somewhat lower temperature and is then churned or agitated to coalesce the butterfat into a continuous phase. At this time the cream changes from a solution of fat in serum to one of serum in fat, with a large part of the serum existing as free liquid.

The free liquid is readily drained off, and the fat, now semisolid and continuous in phase, may be extruded as butter. The extrusion of the butter is preferably accompanied by pressure or some mixing or kneading thereof so the butter is "worked" and gives up some of the serum entrained therein. By adjusting the amount of working of the butter during the extrusion thereof the amount of serum remaining therein to give the final butter product the proper texture and consistency can be regulated. Also, should it be desirable to add salt or coloring matter, it is preferably accomplished at this time so that it becomes thoroughly admixed with the butter being extruded. The extruded butter, being a completed and uniform product, may now be packaged for marketing.

The accompanying drawing illustrates somewhat more in detail the process according to this invention, although it will be understood that the practice of this invention is not limited to the precise proportions, ratios, temperatures, and the like set forth in the process illustrated in the drawing.

Referring to the drawing, it will be seen that the first step in connection with manufacturing butter according to my process is the freezing of the cream and a dehydration thereof to about 38 per cent solids.

In connection with the freezing and dehydration step, it will be understood that there are a number of different ways in which this can be carried out. For example, the cream could be subjected to pressure, as by a hydraulic or mechanically driven ram, after being frozen, and thereby squeeze out a certain amount of the milk serum therefrom. Another manner of effecting the separation of the cream and milk serum would be to centrifuge the frozen product until the desired degree of separation of fat and milk serum took place. In any case, the butter fat is concentrated to approximately the best degree for rapid churning while still retaining a sufficient milk serum to impart the necessary characteristics to the butter required by commercial practice.

The second step in the process is the thawing of the frozen and dehydrated cream to a temperature which will permit churning thereof. As shown in the chart, the dehydrated cream may be thawed to room temperature, but in certain instances, it may be preferable to hold the cream at a temperature lower than this. The churning characteristics of the cream will be largely determinative of this, as well as the economy it is necessary to observe in connection with the degree of conversion of the fat to butter.

After the dehydrated cream has been thawed to the desired churning temperature, it is then churned or agitated in some manner in order to coalesce the butterfat into a continuous phase. This churning may be accomplished by mechanical agitators or beaters, or by blowing gas through the cream, or by otherwise agitating the cream so that the globules of butterfat are brought into intimate contact with each other with sufficient force to cause them to coalesce.

The conversion of the butterfat into a continuous phase is accompanied by a release of a substantial amount of the milk serum or solute as a free liquid. This free liquid, is, of course, readily extracted from the mixture by a simple process of draining it off gravitationally. The product remaining after the free liquid is poured off is the coalesced butterfat, having milk serum entrained therein in the form of fine droplets dispersed throughout the mass of fat.

In order to bring this mixture into the proper condition, it is desirable to knead or work the mass to remove a portion of the entrained serum therefrom. This is preferably accomplished simultaneously with the extrusion of the butter by carrying out the extrusion with a suitably formed screw type extruding mechanism or the like which will at one time apply pressure to the butter while also kneading or working it.

Should the product desired be sweet butter, then no salt is added, although there may be just prior to the extruding of the butter a certain amount of coloring matter added in order to give the product the proper color. However, if the usual type of salted butter is desired, then the salt and coloring matter, if desired, is added to the butter just prior to its extrusion, so that it is thoroughly worked into and admixed with the butter.

It will be evident that the foregoing process, with the possible exception of the initial dehydration step, can be carried out as a continuous cycle, and that in this manner, the production is relatively uniform, and a minimum of equipment is required.

It will also be understood that the cream, either prior or subsequent to the dehydrating step, is preferably ripened, either by natural aging or by the addition thereto of a suitable ripening agent. It will be understood, however, that the particular manner of ripening the cream to produce the proper flavor and odor in the finished product is not necessarily a part of this invention, but is a step well known and practiced in the art of butter manufacture.

The process described above is in connection with the manufacture of table butter from cream, but, as mentioned before, this invention is not intended to be limited to the manufacture of that particular type of butter but is intended to include within its scope the manufacture of all butters which are arrived at by the concentration and subsequent coalescing of fat or oil particles in either animal or vegetable products.

An essential step in connection with the making of butter from any oil or fat bearing substance according to this invention is that of freezing and dehydrating the substance, whereby the said fat or oil therein becomes concentrated.

It will be understood that I do not wish to be limited to the exact proportions, ratios, and other factors specifically set forth in the foregoing description and the accompanying drawing but desire to comprehend such changes thereof as may be further desirable to adapt my invention to different conditions and usages.

I claim:

1. The method of making butter which comprises: freezing an oil bearing substance and removing water therefrom while frozen to concentrate the oil therein, thawing the concentrated substance and churning the thawed substance to coalesce the oil therein to make butter.

2. The method of making butter which comprises: freezing a fat bearing substance and extracting water therefrom while so frozen to concentrate the fat, thawing the concentrated substance, and agitating the thawed substance to coalesce the fat therein to convert the said fat to a state of continuous phase.

3. The method of making butter which comprises: freezing cream and at least partially dehydrating the cream by removing milk serum therefrom while frozen, thawing the concentrated cream, churning the thawed cream to coalesce the fat therein, and draining the free milk serum from the mixture of coalesced butterfat and serum.

4. The method of making butter which comprises: freezing cream and at least partially dehydrating the cream by removing milk serum therefrom while frozen, thawing the concentrated cream, churning the thawed cream to coalesce the fat therein, draining the free milk serum from the mixture of coalesced butterfat and serum, and working the coalesced butterfat to extract a portion of the entrained serum therefrom.

5. The method of making butter which comprises: freezing cream and at least partially dehydrating the cream by removing milk serum therefrom while frozen, thawing the concentated cream, churning the thawed cream to coalesce the fat therein, draining the free milk serum from the mixture of coalesced butterfat and serum, working the coalesced butterfat to extract a portion of the entrained serum therefrom, and extruding the worked butter.

6. The method of making butter which comprises: freezing cream and removing at least a portion of the milk serum therefrom while frozen, thawing the concentrated cream, churning the thawed cream to coalesce the fat therein, draining milk serum from the churned cream leaving the coalesced butterfat, working the coalesced butterfat to extract a part of the entrained serum therefrom, adding salt to the butter while it is being worked, and extruding the worked and salted butter.

7. The method of making butter which comprises: freezing cream and removing at least a portion of the milk serum therefrom while frozen, thawing the concentrated cream, churning the thawed cream to coalesce the fat therein, draining milk serum from the churned cream leaving the coalesced butterfat, working the coalesced butterfat to extract a part of the entrained serum therefrom, adding salt and coloring matter to the butter while it is being worked, and extruding the worked butter.

8. The method of making butter continuously which comprises: freezing a mixture of milk serum and butterfat and extracting milk serum therefrom while frozen, thawing the concentrated cream, agitating the thawed cream to coalesce the butterfat therein, extracting the free milk serum released by the coalescing of the butterfat, kneading the coalesced butterfat, extruding the kneaded butterfat, and carrying out the foregoing steps as a continuous cycle.

9. The method of making butter continuously which comprises: freezing a suspension of butterfat in milk serum and extracting serum therefrom while frozen to reduce the mixture to approximately 38 per cent solids, thawing the frozen mixture to approximately room temperature, and thereafter agitating the mixture to coalesce the butterfat therein, kneading the coalesced butterfat while simultaneously extruding the same, and extracting serum during the aforementioned agitating, kneading and extruding.

10. In the art of manufacturing butter, the method of preparing cream for churning which comprises: freezing the cream, and extracting milk serum from the frozen cream thereby to increase the concentration of the butterfat in the cream.

11. In the art of manufacturing butter, the method of preparing cream for churning which comprises: freezing the cream, and extracting milk serum from the frozen cream to raise the concentration of the butterfat therein to the order of 38 per cent.

12. The method of making butter from an aqueous mixture having fat particles in suspension therein which comprises: freezing the mixture and removing at least a part of the water therefrom while in the frozen state, thawing the mixture, agitating the thawed mixture to coalesce the fat therein, draining further water from the churned mixture leaving the coalesced fat, and kneading the coalesced fat until it is uniform throughout.

HARRY A. TOULMIN, Jr.

REFERENCES CITED

The following references are of record in the file of this patent:

UNITED STATES PATENTS

| Number | Name | Date |
|---|---|---|
| 913,920 | Schou | Mar. 2, 1909 |
| 1,791,069 | Wendt | Feb. 3, 1931 |
| 2,150,943 | Sharples | Mar. 21, 1939 |